United States Patent [19]

Hicks

[11] Patent Number: 5,782,169
[45] Date of Patent: Jul. 21, 1998

[54] FOOD PROCESSING SYSTEM

[75] Inventor: Kevin Joseph Hicks, Middle Cove, Australia

[73] Assignee: Auto-Bake Pty Ltd, Australia

[21] Appl. No.: 868,163

[22] Filed: Jun. 3, 1997

[30] Foreign Application Priority Data

Jun. 3, 1996 [AU] Australia ................. PO0244

[51] Int. Cl.⁶ ............... A47J 37/00; A21B 1/42; A21B 3/07; A21B 7/00
[52] U.S. Cl. ................. 99/355; 99/386; 99/427; 99/443 C; 99/477; 126/21 A; 219/388
[58] Field of Search ............ 99/339, 340, 352–355, 99/365, 372, 373, 443 R, 443 C, 427, 477–479, 386; 126/21 A, 21 R, 92 C, 246; 198/820; 219/388, 400, 411; 432/126, 128, 133, 148, 230, 194; 426/523, 520, 509, 233

[56] References Cited

U.S. PATENT DOCUMENTS

| | | | |
|---|---|---|---|
| 1,335,915 | 4/1920 | Pointon | 432/128 |
| 3,502,020 | 3/1970 | Bressickello | 99/443 C |
| 4,004,129 | 1/1977 | Hicks | 99/386 X |
| 4,034,119 | 7/1977 | Kanbe et al. | 99/355 |
| 4,164,591 | 8/1979 | Ahlgren et al. | 426/523 |
| 4,191,881 | 3/1980 | Ahlgren et al. | 219/388 |
| 4,204,466 | 5/1980 | Schnee | 99/443 C |
| 4,517,447 | 5/1985 | Hicks | 99/443 C |
| 4,784,053 | 11/1988 | Barnhart | 99/386 X |
| 4,850,845 | 7/1989 | Hicks | 425/289 |
| 5,016,528 | 5/1991 | Chen | 99/427 X |
| 5,123,336 | 6/1992 | Konig | 99/355 |
| 5,277,104 | 1/1994 | Colaner | 99/352 X |

FOREIGN PATENT DOCUMENTS

16106/83  2/1984  Australia.

*Primary Examiner*—Timothy F. Simone
*Attorney, Agent, or Firm*—Ladas & Parry

[57] ABSTRACT

A food processing system which includes a product baking stage (10), a product processing stage (11) and an endless conveyor (19) which is driven to carry product support trays (22) serially through the processing and baking stages. The endless conveyor (19) has a forward path (20) which extends through both the processing and the baking stages and a return path (21). The baking stage (10) comprises a baking chamber (26) through which the conveyor is guided to follow a path which includes a plurality of horizontal passes (27). The processing stage (11) comprises three interconnected compartments (29, 30 and 31) and in two of the compartments (29 and 30) the conveyor is guided to follow paths which include a plurality of horizontal passes (32). In the third processing compartment (31) both the forward path (20) and the return path (21) of the conveyor are guided to make a plurality of vertically extending passes. A conveyor transport mechanism (36) is located within the third processing compartment (31) and is drivable (upwardly and downwardly) in the vertical direction to effect simultaneously complementary changes in the lengths of the forward and return path portions of the conveyor that are at any one time located within the third processing compartment.

10 Claims, 2 Drawing Sheets

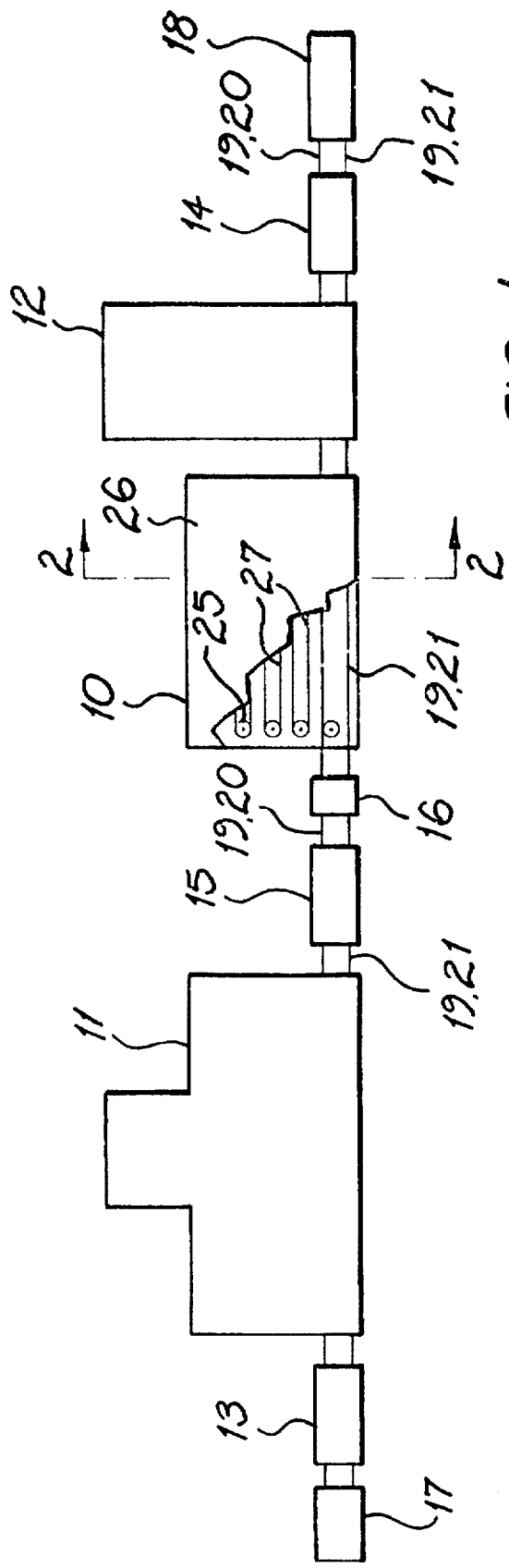
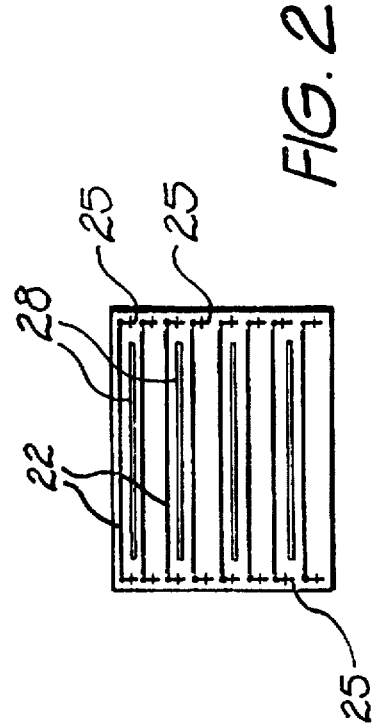

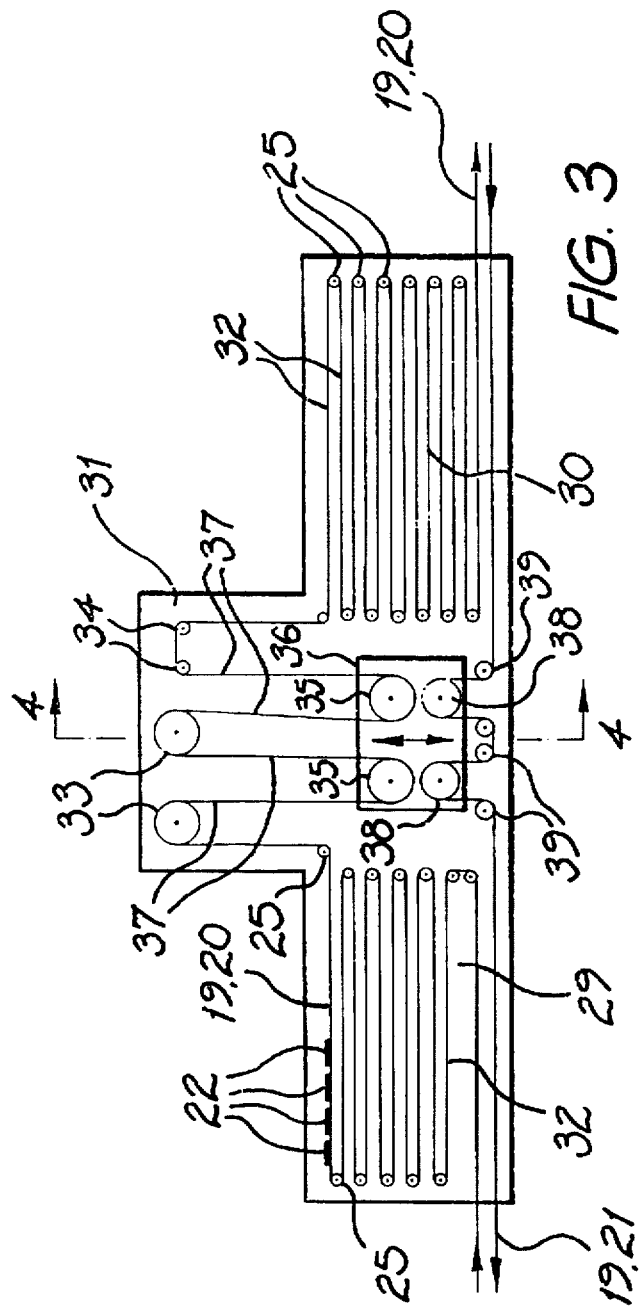
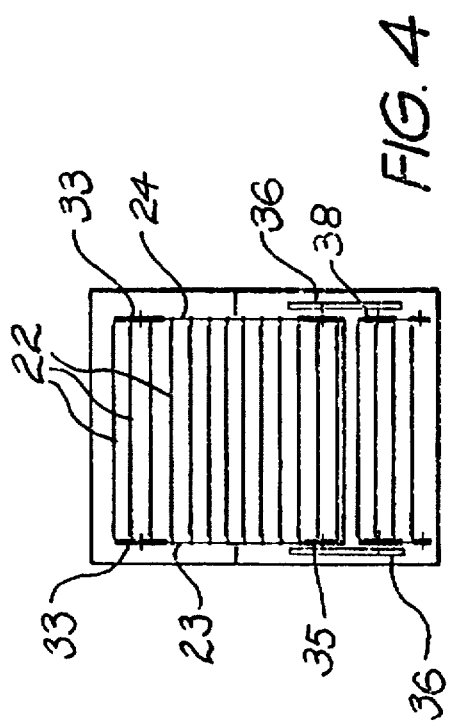

5,782,169

FOOD PROCESSING SYSTEM

FIELD OF THE INVENTION

This invention relates to a food processing system which includes a baking stage and a separate processing stage. The invention has particular application to and has been developed for use in the manufacture of bread, and the invention is hereinafter described in that context. However, it will be understood that the invention may have application to the processing of other food products.

BACKGROUND OF THE INVENTION

A basic bread manufacturing procedure involves a multi-stage process in which dough is first mixed with a fermenting agent, is kneaded and set aside whilst initial fermentation occurs. Then, the dough is punched-down, deposited in baking trays, subjected to a further fermentation or proving stage in a warm, humid environment, and baked. The baking stage involves a number of dependent variables, including heat level and baking time. The heat level is controlled by regulating the energy input from heating elements at various regions throughout the oven. The baking time is controlled by regulating the product residence time within the oven and this is determined by the product transport velocity. The bread products are conventionally carried by tray-supporting conveyors, and the product transport velocity is varied by adjusting the conveyor drive velocity.

The proving stage also involves a number of dependent variables, namely heat level, humidity level and proving time. These variables can be controlled for optimum proving in much the same way that the variables are accommodated in the baking process.

Flowing from the development of modern food processing ovens by Auto-Bake Pty Ltd and the adaptation of the ovens for use in the baking of bread, automated in-line processing of bread has become feasible. However, before in-line automated processing may be adopted, it will be necessary to accommodate the circumstance where the proving time may need to be significantly greater than the baking time, particularly in relation to small volume products such as bread rolls which require a relatively short baking time. Also, it will be necessary to accommodate the existence of independent variables in controls applicable to the proving and baking stages. That is, the transport velocity required for a given product in the oven may not be appropriate to provide the residence time required by dough that is at the same time passing through a preceding prover. Therefore, it may not be possible in a given operation to change the product transport velocity through the oven without creating potentially adverse consequences within the prover.

The present invention seeks to meet the possibility of the above described conflicting requirements by providing an arrangement in which the residence time within a prover may be varied independently of the product transport drive velocity. This is required in order that the proving time may be changed without significantly modifying the product transport drive velocity or, in the alternative, so that the product transport time through the oven may be varied whilst maintaining substantially constant the residence time of products within the prover.

SUMMARY OF THE INVENTION

The present invention may be defined in broad terms as providing a food processing system which includes a product baking stage, a product processing stage, and an endless conveyor which is in use driven to carry product support trays serially through the two stages. The endless conveyor has a forward path, which extends through both the processing and baking stages, and a return path. The baking stage comprises a baking chamber through which the conveyor is directed to follow a generally serpentine path which includes a plurality of horizontal passes at different levels in the chamber, and the baking stage further comprises heating elements located between at least some of the horizontal passes of the conveyor. The processing stage comprises a processing chamber having at least one processing compartment through which the conveyor is directed to follow a generally serpentine path which includes a plurality of horizontal passes at different levels. Also, the system includes means for varying the effective length of the portion of the forward path of the conveyor which is at any one time located within the processing chamber and for making a complementary variation in the length of a further portion of the conveyor.

In operation of the above defined system, the conveyor drive velocity may be maintained constant and the effective path length of the portion of the forward path of the conveyor that is located within the processing chamber may be changed; in which case, the residence time of the forward path of the conveyor within the processing chamber will be changed. In an alternative operation, the conveyor drive velocity may be changed and the effective length of the portion of the forward path of the conveyor within the processing chamber may be changed; in which case the residence time of the forward path of the conveyor within the processing chamber may be maintained constant, whilst the transport velocity and, hence, the conveyor residence time within the baking chamber are varied. As a further alternative, the system may be operated in a manner such that both the processing chamber residence time and the baking chamber residence time for the conveyor are varied, either in unison or differentially.

PREFERRED FEATURES OF THE INVENTION

The effective length of the portion of the forward path of the conveyor may be varied within the processing chamber by moving sprockets that support some or all of the horizontal passes of the conveyor within the processing chamber, so that the length of each of those horizontal passes of the conveyor is effectively changed. The resultant increase or reduction (as the case may be) of the length of the conveyor within the chamber may then be accommodated by a complementary change in the length of the conveyor in a further chamber of the system or in the return path of the conveyor. However, the food processing system is preferably arranged in a manner such that the processing chamber includes a region into which a portion of the return path of the conveyor extends, and provision is preferably made for effecting complementary changes in the path lengths of the portions of the forward and return paths of the conveyor within that region of the processing chamber.

The processing chamber preferably is formed with two or more compartments, with one of the compartments (termed a "length adjusting" compartment) incorporating a mechanism which is arranged for making changes in the effective length of the forward path of the conveyor portion within the compartment. The length adjusting compartment most preferably is provided with conveyor guiding elements that are arranged to guide the conveyor through vertically extending passes within the compartment.

In a particularly preferred form of the invention, the length adjusting compartment of the processing chamber is provided with a conveyor transport mechanism which is arranged to carry portions of both the forward and the return paths of the conveyor. In so doing, the transport mechanism may be used simultaneously to effect complementary changes in the lengths of the forward and return path portions of the conveyor that are at any one time located within the length adjusting compartment of the processing chamber.

The length adjusting compartment may be located at either end or somewhere between the two ends of the processing chamber. In the broader sense of the invention, the only requirement is that provision be made for adjusting the effective length and, hence, the residence time of the portion of the forward path of the conveyor that is at any one time located within the processing chamber. This requirement exists because it is the forward path of the conveyor that carries food products through the processing and baking stages.

Depending upon the nature of the operation to be performed in the processing stage, the processing stage may be positioned before or behind the baking stage. When, as in a bread making process the processing stage includes a proving chamber, the processing stage will be located before the baking stage so that proving is effected prior to baking. However, other processes may need to be performed after product baking, in which case the processing stage with the length adjusting compartment will be located to follow the baking stage.

The total system may also include further stages, including product cooling and refrigeration stages, in addition to loading and unloading stations at which raw and finished products are loaded onto and removed from the conveyor.

The conveyor preferably comprises two spaced-apart parallel conveyor chains which carry product support trays. The product support trays extend between and are pivotably mounted to the conveyor chains, so that they may maintain a horizontal disposition when moving through the various processing and baking stages.

The invention will be more fully understood from the following description of a preferred embodiment of a complete food processing system which has been developed for use in in-line processing of bread products. The description is provided with reference to the accompanying drawings.

BRIEF DESCRIPTION OF THE DRAWINGS

In the drawings:

FIG. 1 shows a diagrammatic representation of the complete system,

FIG. 2 shows a sectional elevation view of a baking stage of the system, as seen in the direction of section plane 2—2 shown in FIG. 1, FIG. 3 shows a more detailed side view of a processing stage of the system as illustrated in FIG. 1, and FIG. 4 shows a sectional end view of a portion of the processing stage as seen in the direction of section plane 4—4 shown in FIG. 3.

DETAILED DESCRIPTION OF THE INVENTION

As illustrated, the food processing system includes a baking stage 10, a preceding proving stage 11, a post-baking cooling stage 12, an infeed drive unit 13, an outfeed drive unit 14, an intermediate drive unit 15, an electrical control system 16, a product loading station 17, and a product take-off station 18. An endless conveyor 19 extends through all stages of the system and is used to carry food products from the loading station 17 to the take-off station 18. The conveyor has a forward path 20 which progresses through the various stages and a return path 21 which moves directly from the take-off station 18 to the loading station 17.

Product support trays 22 are carried along the forward and return paths 20 and 21 by the conveyor but products are removed from the trays at the take-off station 18 before successive portions of the conveyor commence movement along the return path 21.

The three drive units 13, 14 and 15 are controlled to provide a variable speed, synchronised drive to the conveyor, and the drive units incorporate mechanisms for maintaining substantially constant tension and for taking-up any slack in the conveyor.

The conveyor 19 comprises two spaced-apart, parallel conveyor chains 23 and 24 (FIG. 4) and, although not shown throughout the drawings, the conveyor chains 23 and 24 carry the product support trays 22 in close spaced relationship. A few only of the trays are shown in FIG. 3.

The trays 22 are pivotably mounted to the conveyor chains so that they will maintain a horizontal disposition when being conveyed around support sprockets 25 and the trays are guided along support tracks (not shown) when passing horizontally through the various stages of the system.

The baking stage 10 comprises a baking chamber 26 through which the conveyor 19 is directed to follow a serpentine path which includes a plurality of horizontal passes 27 at ascending levels within the chamber 26. The conveyor passes around the sprockets 25 in moving from one horizontal pass to the next, and heating elements 28 are located between some of the horizontal passes within the chamber 26. The heating elements 28 are controlled to maintain predetermined temperature levels within different zones of the baking chamber, and heat energy may be delivered by electrical resistance elements or radiant heater elements through which heated fluid (i.e. a gas or liquid heat exchange fluid) is passed.

The proving stage 11 comprises a chamber having three interconnected compartments 29, 30 and 31 through which the forward and return paths 20 and 21 of the conveyor both pass. The compartments 29 and 30 are similar in construction to the baking chamber 26, in that sprockets are provided to direct the forward path 20 of the conveyor 19 through a series of horizontal passes 32. Ducting (not shown) is provided for directing heated, vapour saturated air through the compartments 29 and 30 for promoting proving of dough which is carried through the chambers.

As stated previously, it may be desirable that the proving time be varied relative to the baking time; that is, without changing the transport drive velocity that determines the speed at which the conveyed product is transported through the baking chamber 26. This is achieved in accordance with the present invention by varying (i.e., increasing or decreasing) the length of the forward path of the conveyor 19 within the proving system 11.

The path length adjustment is made within the central compartment 31 of the proving system 11, and for this purpose the forward path 20 of each of the conveyor chains 23 and 24 passes around four upper sprockets 33 and 34 and two lower sprockets 35. The lower sprockets 35 are carried by a transport mechanism 36 which is movable (upwardly and downwardly) in the vertical direction and which, as a consequence, is arranged to change the effective length of vertically extending conveyor limbs 37.

The transport mechanism 36 also carries two sprockets 38 around which the return path 21 of each of the conveyors 23 and 24 is guided by sprockets 39.

As the transport mechanism 36 is moved downwardly, the effective length of the product carrying portion (i.e., the forward path) of the conveyor 19 is increased, and a complementary decrease is made in the effective length of the return path 21 of the conveyor portion that is located within the central compartment 31.

Although not shown in the drawings, the transport mechanism 36 may itself be driven to move upwardly and downwardly, as required, by a motor-driven positioning chain. Alternatively, a fluid drive system may be employed for moving the transport mechanism upwardly and downwardly.

I claim:

1. A food processing system which includes a product baking stage, a product processing stage, and an endless conveyor which is in use driven to carry product support trays through the two stages, the endless conveyor having a forward path, which extends serially through both the processing and baking stages, and a return path; the baking stage comprising a baking chamber through which the conveyor is directed to follow a generally serpentine path which includes a plurality of horizontal passes at different levels in the chamber, and the baking stage further comprising heating elements located between at least some of the horizontal passes of the conveyor; the processing stage comprising a processing chamber having at least one processing compartment through which the conveyor is directed to follow a generally serpentine path which includes a plurality of horizontal passes at different levels; and the system including means for varying the effective length of the portion of the forward path of the conveyor which is at any one time located within the processing chamber and for making a complementary variation in the length of a further portion of the conveyor.

2. The system as claimed in claim 1 wherein means for driving the conveyor incorporate means for varying the conveyor transport velocity.

3. The system as claimed in claim 1 wherein the processing chamber is formed with at least two interconnecting compartments and wherein one of those compartments comprises a length adjusting compartment which incorporates the means for varying the effective length of the forward path of the conveyor that is at any one time located within the length adjusting compartment.

4. The system as claimed in claim 3 wherein the means for varying the effective length of the forward path of the conveyor incorporates conveyor guiding elements that are arranged to guide the conveyor through vertically extending passes within the length adjusting compartment.

5. The system as claimed in claim 4 wherein the means for varying the effective length of the forward path of the conveyor comprises a conveyor transport mechanism which carries portions of both the forward and the return path of the conveyor and which is arranged to effect complementary changes in the lengths of the forward and return path portions of the conveyor that are at any one time located within the length adjusting compartment.

6. The system as claimed in claim 5 wherein the conveyor transport mechanism carries some of the conveyor guiding elements that are arranged to guide the forward and return paths of the conveyor through the vertically extending passes, and wherein the conveyor transport mechanism is itself driven to move upwardly and downwardly, as required, in the vertical direction.

7. The system as claimed in claim 6 wherein the forward and return paths of the conveyor are directed through the length adjusting compartment in a manner such that when the conveyor transport mechanism is driven to move upwardly the effective length of the forward path of the conveyor is increased and the effective length of the return path of the conveyor is decreased.

8. The system as claimed in claim 3 wherein the processing chamber comprises three interconnecting compartments and wherein the length adjusting compartment is located between two processing compartments through which the forward path of the conveyor is directed to make horizontal passes at different levels.

9. The system as claimed in claim 8 wherein ducting is provided for directing heated, vapor saturated air through the processing compartments.

10. The system as claimed in claim 1 wherein the conveyor comprises two spaced-apart parallel conveyor chains which carry product support trays, the support trays extending between and being pivotably mounted to the conveyor chains so that they will maintain a horizontal disposition when moving through the product baking and processing stages.

* * * * *